(12) United States Patent
Brickner et al.

(10) Patent No.: US 12,210,171 B2
(45) Date of Patent: Jan. 28, 2025

(54) COMBINED COLLIMATION AND DIFFUSER LENS FOR FLOOD ILLUMINATOR

(71) Applicant: Waymo LLC, Mountain View, CA (US)

(72) Inventors: Michael Brickner, Mountain View, CA (US); Hui Son, Hayward, CA (US); Chandra Kakani, Fremont, CA (US); Erin Eppard, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 1058 days.

(21) Appl. No.: 17/125,140

(22) Filed: Dec. 17, 2020

(65) Prior Publication Data

US 2022/0196891 A1 Jun. 23, 2022

(51) Int. Cl.
| | |
|---|---|
| *G02B 5/02* | (2006.01) |
| *B60W 60/00* | (2020.01) |
| *G01S 7/481* | (2006.01) |
| *G01S 17/08* | (2006.01) |
| *G01S 17/931* | (2020.01) |

(Continued)

(52) U.S. Cl.
CPC .......... *G02B 5/0205* (2013.01); *G01S 7/4814* (2013.01); *G01S 17/08* (2013.01); *G01S 17/931* (2020.01); *G02B 1/04* (2013.01); *G02B 1/11* (2013.01); *G02B 3/08* (2013.01); *B60W 60/00* (2020.02); *B60W 2420/408* (2024.01)

(58) Field of Classification Search
None
See application file for complete search history.

(56) References Cited

U.S. PATENT DOCUMENTS 3,670,260 A * 6/1972 Koester ................ G02B 27/123
372/100
4,813,762 A 3/1989 Leger et al.
(Continued)

FOREIGN PATENT DOCUMENTS

| CN | 206861305 U | | 1/2018 | |
|---|---|---|---|---|
| JP | 01010310 | * | 1/1990 | ............. G01B 27/12 |

(Continued)

OTHER PUBLICATIONS

Cirino et al., "Low-cost Fresnel microlens array fabricated by a home-built maskless lithography system," Proceedings of SPIE—The International Society for Optical Engineering, Oct. 2012, 7 pages.

(Continued)

*Primary Examiner* — Luke D Ratcliffe
(74) *Attorney, Agent, or Firm* — MCDONNELL BOEHNEN HULBERT & BERGHOFF LLP (57) ABSTRACT

The present disclosure relates to optical systems and vehicles, which may incorporate lidar sensors. An example optical system includes a light-emitter device configured to emit emission light. The optical system also includes an optical element including a first surface and an opposing second surface. The first surface includes a diffusing surface configured to diffuse the emission light to form diffused light. The second surface includes a focusing surface. A combination of the first surface and the second surface are configured to provide an intensity profile of light emitted within a field of view of the optical system.

20 Claims, 6 Drawing Sheets

(51) Int. Cl.
*G02B 1/04* (2006.01)
*G02B 1/11* (2015.01)
*G02B 3/08* (2006.01)

(56) References Cited

U.S. PATENT DOCUMENTS

| | | |
|---|---|---|
| 5,150,966 A | 9/1992 | Nelson |
| 5,315,427 A | 5/1994 | Rauch et al. |
| 6,859,326 B2 | 2/2005 | Sales |
| 7,652,752 B2 | 1/2010 | Fetzer et al. |
| 7,706,073 B2 | 4/2010 | Munro |
| 9,831,630 B2 | 11/2017 | Lipson |
| 2002/0034710 A1 | 3/2002 | Morris et al. |
| 2002/0159044 A1 | 10/2002 | Mei et al. |
| 2009/0306892 A1 | 12/2009 | Malka et al. |
| 2010/0195202 A1 | 8/2010 | Masalkar |
| 2015/0253469 A1 | 9/2015 | Le Gros et al. |
| 2016/0164261 A1* | 6/2016 | Warren .......... H04N 23/11 372/50.122 |
| 2016/0197452 A1* | 7/2016 | Mor ............ H01S 5/423 359/569 |
| 2018/0316160 A1* | 11/2018 | Raring ........... H01S 5/02326 |
| 2019/0179028 A1* | 6/2019 | Pacala ........... G01S 7/486 |

FOREIGN PATENT DOCUMENTS

| | | |
|---|---|---|
| JP | H02010310 | 1/1990 |
| JP | 2000321675 | 11/2000 |
| JP | 2008033097 | 2/2008 |
| WO | 2006/045545 | 5/2006 |

OTHER PUBLICATIONS

Wang et al., "Design of optical element combining Fresnel lens with microlens array for uniform light-emitting diode lighting," Journal of the Optical Society of America A, Aug. 16, 2012, vol. 29, No. 9.
Japanese Patent Office, Office Action mailed on Jan. 13, 2023, issued in connection with Japanese Patent Application No. 2021-199421, 11 pages (with English Translation).

* cited by examiner

COMBINED COLLIMATION AND DIFFUSER LENS FOR FLOOD ILLUMINATOR

BACKGROUND

Flood illuminator systems may be configured to emit light into a field of view such that the emitted light has an angularly-controlled top-hat intensity profile. Conventional illuminator systems may include a light source, a first optical element, and a second optical element.

In such scenarios, the light source could emit emission light that interacts with the first optical element so as to collimate the emission light, forming collimated light. The collimated light could subsequently interact with the second optical element so as to diffuse the collimated light, forming diffused light. In some conventional examples, the first optical element could include a flat (e.g., plano) surface and focusing surface (e.g., a Fresnel lens surface). The second optical element could include a flat (e.g., plano) surface and diffusing surface. As an example, conventional systems utilized in retail display lighting involve separate optical elements for the lens and diffuser.

SUMMARY

In the present disclosure, optical systems and vehicles are described as including a single optical element that could include a diffusing surface and a focusing surface. Such embodiments could replace two individual lenses with a single combination lens element.

In a first aspect, an optical system is provided. The optical system includes a light-emitter device configured to emit emission light and an optical element. The optical element includes a first surface and an opposing second surface. The first surface includes a diffusing surface configured to diffuse the emission light to form diffused light. The second surface includes a focusing surface. A combination of the first surface and the second surface is configured to provide an intensity profile of light emitted within a field of view of the optical system.

In a second aspect, a vehicle is provided. The vehicle includes an optical system. The optical system includes a lidar system configured to provide range data within a lidar field of view. The optical system also includes a light-emitter device configured to emit emission light. The optical system additionally includes an optical element having a first surface and an opposing second surface. The first surface includes a diffusing surface configured to diffuse the emission light to form diffused light. The second surface includes a focusing surface. A combination of the first surface and the second surface is configured to provide an intensity profile of light emitted within a field of view of the optical system.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

In the present disclosure, example embodiments include a single optical element could include a diffusing surface and a focusing surface (e.g., a Fresnel lens surface). Such embodiments could replace two individual lenses with a single combination lens element. In some examples, the single combination lens element could provide optical and alignment simplicity, reduced cost, and reduced mechanical part count. Furthermore, laser safety may also be improved by a single lens embodiment, which reduces the number of potential items that could fail.

In some embodiments, the combination lens element could be injection molded. For example, a two-sided injection mold could be utilized by a lens injection molding tool.

Combination lens elements could be utilized in imaging and non-imaging applications. In some embodiments, an illuminator system with a combination lens element could be utilized to provide a desired intensity profile in support of a camera system and/or a lidar system. The illuminator system could be utilized to provide a desired intensity profile of light in the infrared wavelengths or other optical wavelengths. Additionally or alternatively, the illuminator system could be attached to a vehicle, such as an autonomous or semi-autonomous vehicle.

II. Example Optical Systems

Figure 1:
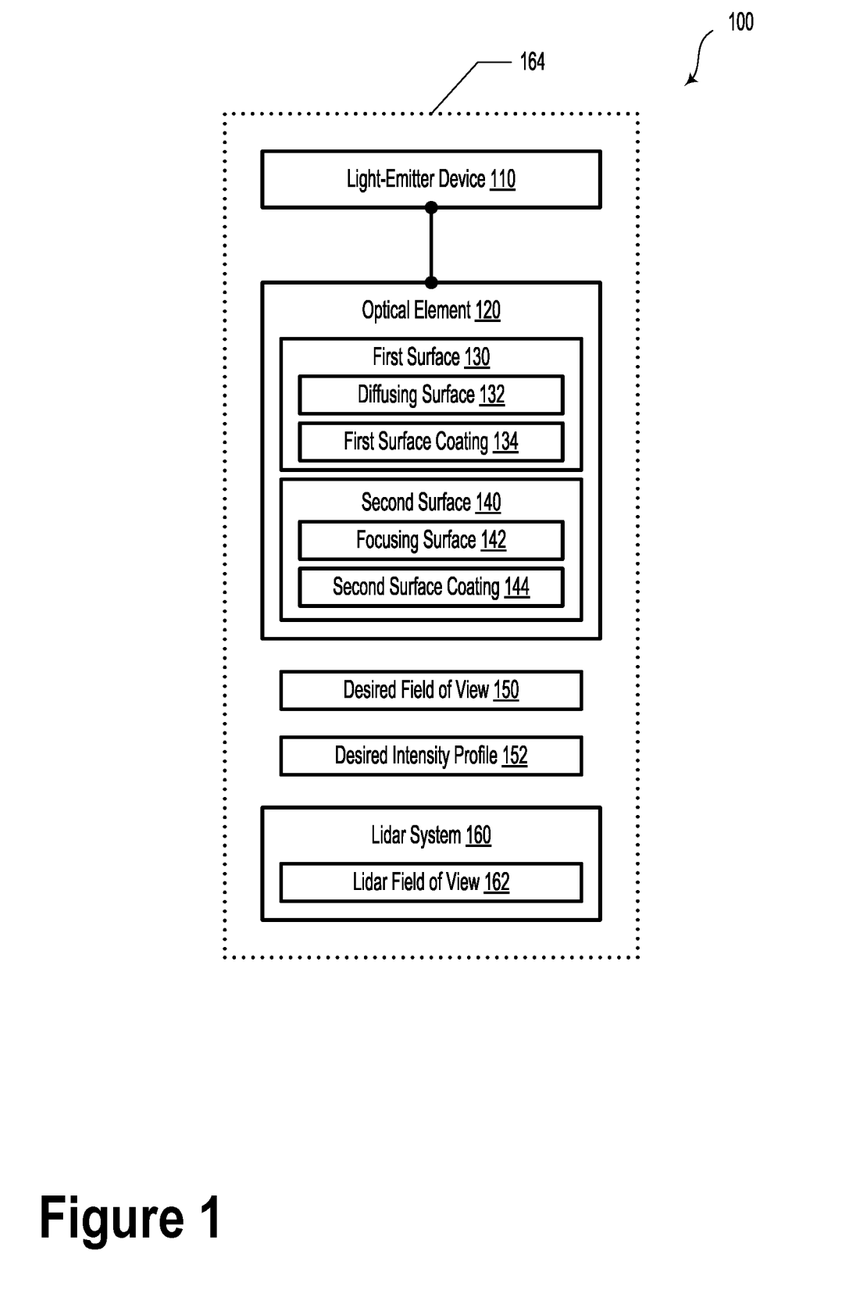
FIG. 1 illustrates an optical system, according to an example embodiment.

FIG. 1 illustrates an optical system 100, according to an example embodiment. In some embodiments, the optical system 100 could include a flood illuminator for a lidar system and/or a camera system. The optical system 100 includes a light-emitter device 110 configured to emit emission light. For example, light-emitter device 110 could include at least one laser diode device (e.g., between 4 and 10 high-power semiconductor lasers and/or light-emitting diodes).

In some examples, the light-emitter device 110 could include a multi-bar laser diode device. In such scenarios, the multi-bar laser diode device could include a plurality of semiconductor laser bars. For example, the multi-bar laser diode device could be configured to emit infrared light pulses. In such scenarios, the infrared light pulses could include light having a wavelength of about 905 nanometers (e.g., between 900 and 910 nanometers, between 895 and 915 nanometers, between 885 and 925 nanometers, etc.). It will be understood that light-emitter devices configured to emit light having other infrared wavelengths (e.g., 700 nanometers to 1 millimeter) are possible and contemplated.

Optical system 100 also includes an optical element 120. The optical element 120 includes a first surface 130 and an opposing second surface 140. The first surface 130 includes a diffusing surface 132 configured to diffuse the emission light to form diffused light. The second surface 140 comprises a focusing surface 142 configured to focus the diffused light to provide a desired intensity profile 152 of light emitted within a desired field of view 150 of the optical system 100. In such scenarios, the combination of the light-emitter device 110 and the optical element 120 could provide a flood illumination source for a lidar system or camera system.

In various embodiments, the optical element 120 could be formed from at least one of: compression molded glass, a cyclic olefin copolymer (COC or COP) material, polymethylmethacrylate (PMMA), polycarbonate (PC), polypropylene (PP), or polyethylene (PE). In such scenarios, optical element 120 could be formed from a moldable optical material. In other examples, the optical element 120 could be formed with a curable adhesive material (e.g., a thermoset epoxy). Yet further, the optical element 120 could be fabricated using semiconductor manufacturing techniques, such as by patterning an optical material using photolithography and etching techniques. It will be understood that other materials and manufacturing techniques are contemplated and possible in forming the optical element 120.

In some embodiments, the focusing surface 142 could include a Fresnel lens surface. It will be understood that other types of optical elements could be utilized so as to diffuse and/or focus light within the scope of the present disclosure. Other examples of focusing surface 142 could include diffractive optical elements and/or holographic elements.

In some embodiments, the first surface 130 could be coated with a first surface coating 134. Additionally or alternatively, the second surface 140 could be coated with a second surface coating 144. As an example, at least one of the first surface 130 or the second surface 140 could be coated by a single-layer anti-reflective coating or a multi-layer anti-reflective coating.

In example embodiments, the optical system 100 could include a lidar system 160. The lidar system 160 could be configured to provide range data within a lidar field of view 162. In such scenarios, the desired field of view 150 could overlap the lidar field of view 162. Additionally or optionally, the lidar system 160 could include a housing 164. In such scenarios, the light-emitter device 110 and the optical element 120 could be disposed inside the housing 164.

In some embodiments, the optical system 100 could be configured to operate within an operating temperature range between −40° C. and 85° C. However, other operating temperature ranges are possible and contemplated.

Figure 2:
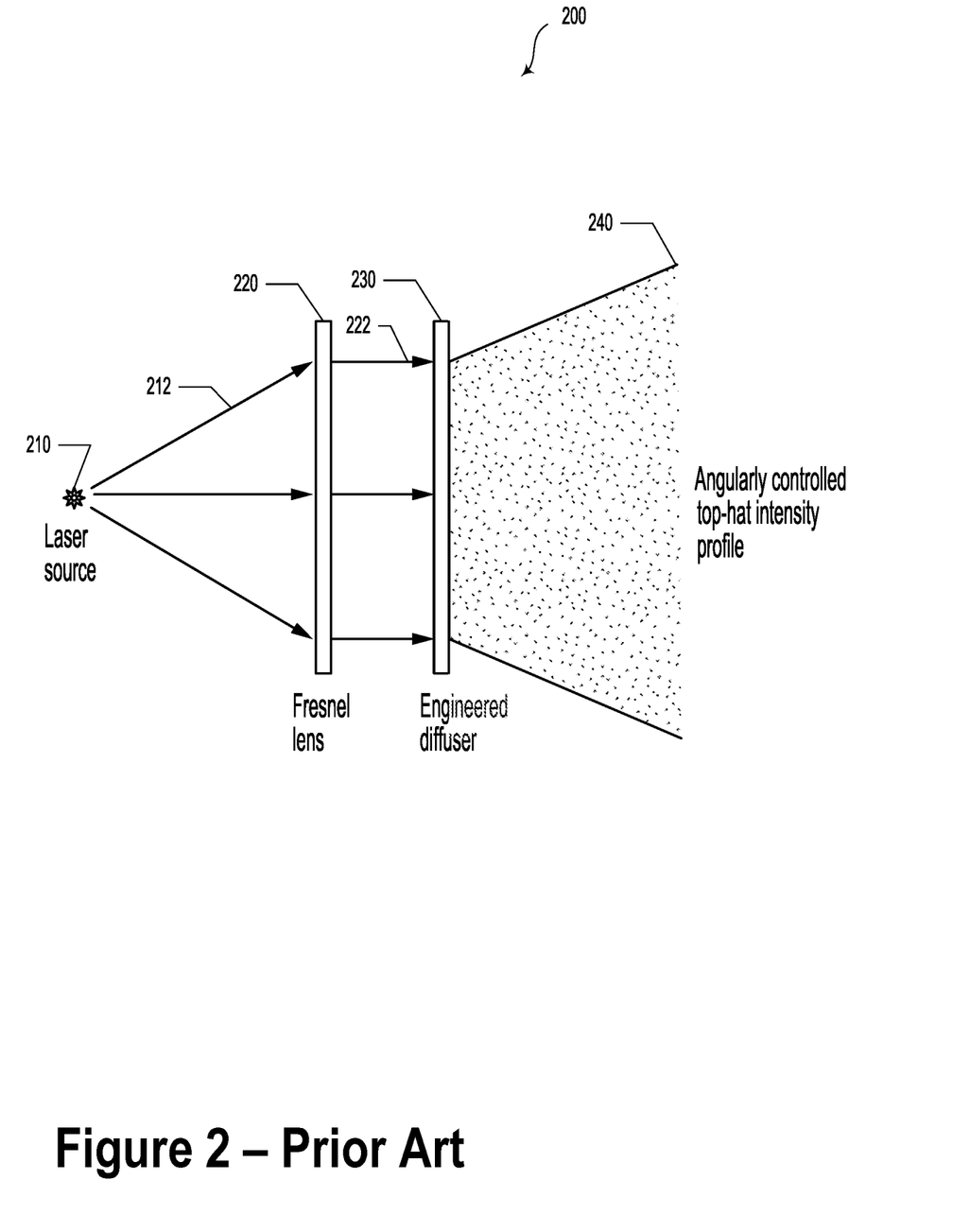
FIG. 2 illustrates a prior art optical system.

FIG. 2 illustrates a prior art optical system 200. As illustrated in FIG. 2, the prior art optical system 200 could include a laser source 210 and a Fresnel lens element 220. The prior art optical system 200 could also include an engineered diffuser 230. The laser source 210 could be configured to emit light 212 toward the Fresnel lens element 220 so as to collimate the emitted light and provide collimated light 222. The collimated light 222 could interact with the engineered diffuser 230 so as to provide an angularly-controlled top-hat intensity profile 240.

Additionally or alternatively, the focusing surface 142 could include a Fresnel lens surface. In some embodiments, the Fresnel lens surface could include a lens that may be substantially thinner than a conventional refractive lens element. That is, a cross-section of the spherical Fresnel lens surface could be substantially thinner than a cross-section of a conventional spherical plano-convex lens of equivalent optical power.

In some embodiments, the Fresnel lens surface could include an imaging (e.g., spherical or cylindrical) lens surface or a non-imaging (e.g., spot or linear) lens surface. In various examples, the Fresnel lens surface could include a plurality of grooved and/or stepped concentric curved surfaces.

In various examples, the optical element 120 could have a rectangular solid shape having a long axis and a short axis. In such scenarios, the optical element 120 including the diffusing surface 132 and the focusing surface 142 (e.g., the Fresnel lens surface) could provide a "fast axis" angular divergence of between 26 degrees and 30 degrees with respect to a normal axis.

In some embodiments, the diffusing surface 132 and the focusing surface 142 (e.g., diffractive optic, holographic element, or Fresnel lens surface) could be configured to provide a "slow axis" angular divergence of between 6.5 degrees and 8.5 degrees with respect to the normal axis.

In example embodiments, the optical element 120 could include a clear aperture. Namely, the clear aperture could include a slow axis clear aperture of at least 10 millimeters and a fast axis clear aperture of at least 40 millimeters. It will be understood that other dimensions of clear aperture are possible and contemplated.

In some examples, at least one of the first surface 130 or the second surface 140 could be configured to provide a back focal length between 40 millimeters and 50 millimeters. However, other back focal lengths are possible. In some embodiments, the light-emitter device 110 could be disposed so as to emit light toward the optical element 120 from a position along the normal axis at or near the back focal length. In positioning and/or arranging the light-emitter device 110 along the normal axis, a centered emission pattern may be provided. Additionally or alternatively, if the light-emitter device 110 is positioned or arranged in an off-axis orientation, the emission pattern may be angularly displaced with respect to the normal axis, but the emission pattern may still retain the angularly-controlled top-hat intensity profile. In such scenarios, the performance of the optical system may be relatively insensitive to the location of the light-emitter device 110.

In some embodiments, the diffusing surface 132 and the focusing surface 142 (e.g., the Fresnel lens surface) could be configured to transmit light within a wavelength range between 900 nanometers and 930 nanometers. It will be understood that the optical element 120 could be configured to transmit light having other wavelengths.

In some embodiments, the desired intensity profile 152 could include a substantially uniform intensity distribution of light across the desired field of view 150. As an example, the intensity distribution could include a uniform distribution of light over a far field region (e.g., 1 meter away, 10 meters away, or 30 meters away) with respect to the optical system 100.

Figure 3:
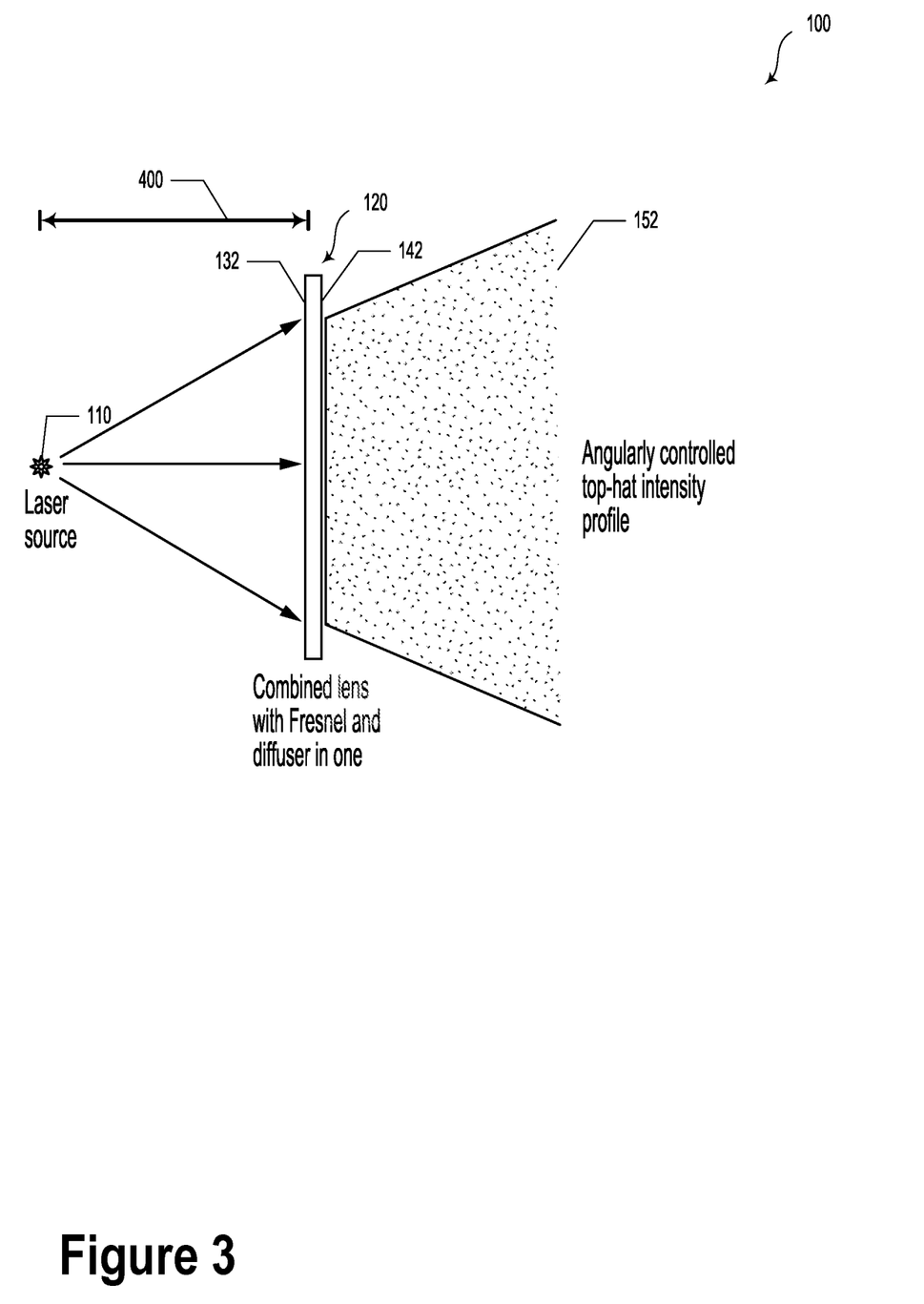
FIG. 3 illustrates the optical system of FIG. 1, according to an example embodiment.
Figure 4A:
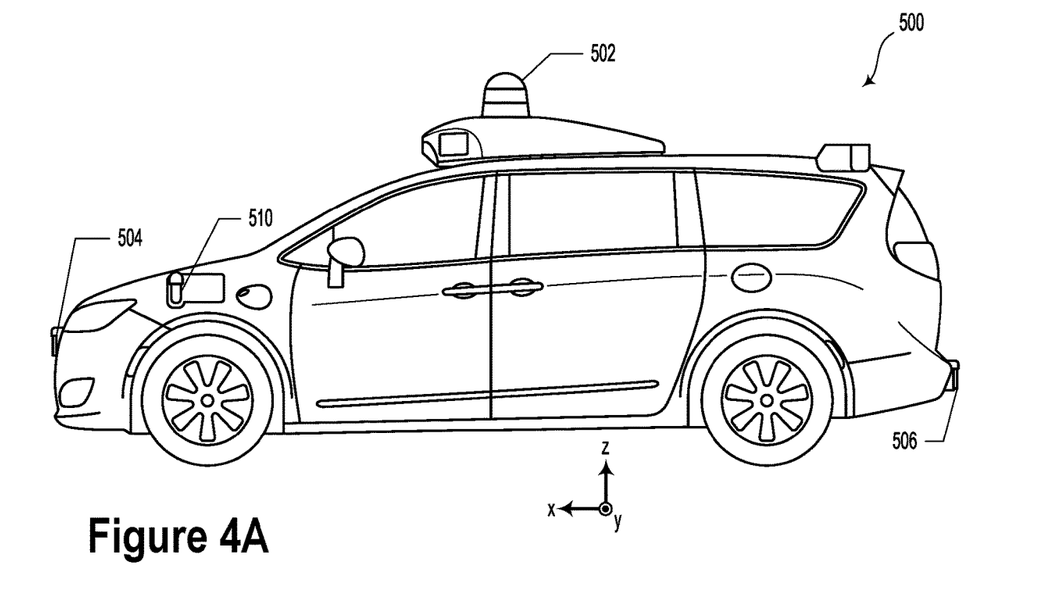
FIG. 4A illustrates a vehicle, according to an example embodiment.
Figure 4B:
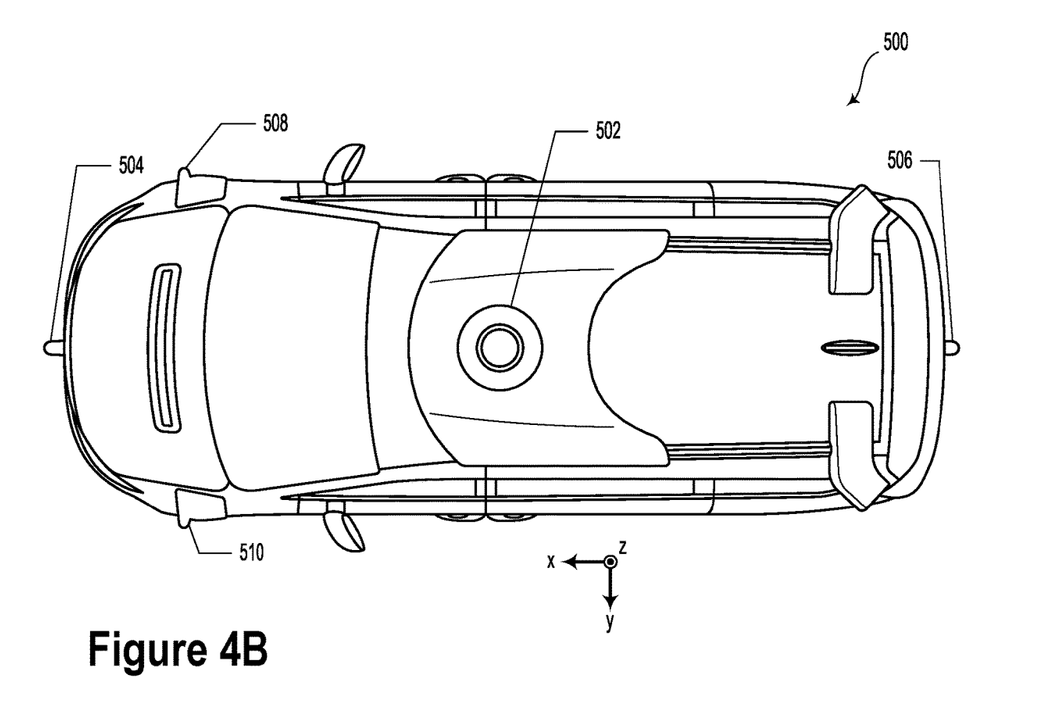
FIG. 4B illustrates a vehicle, according to an example embodiment.
Figure 4C:
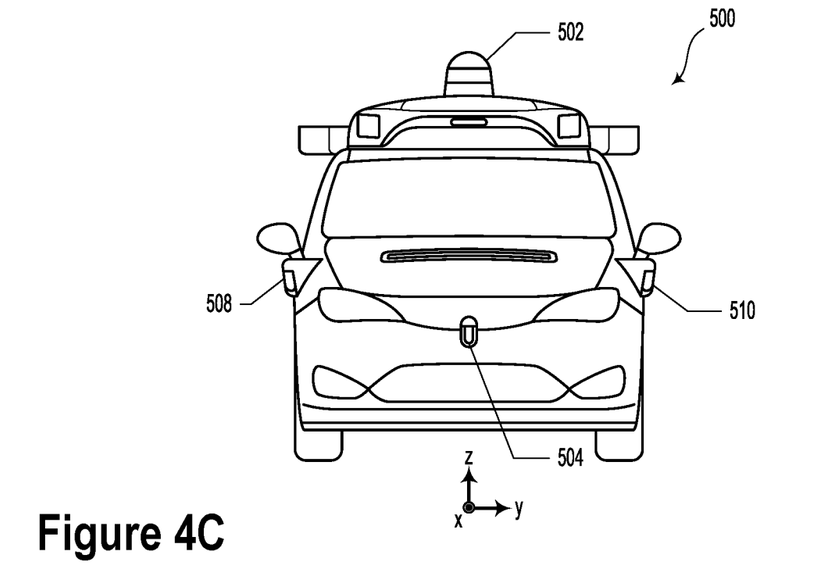
FIG. 4C illustrates a vehicle, according to an example embodiment.
Figure 4D:
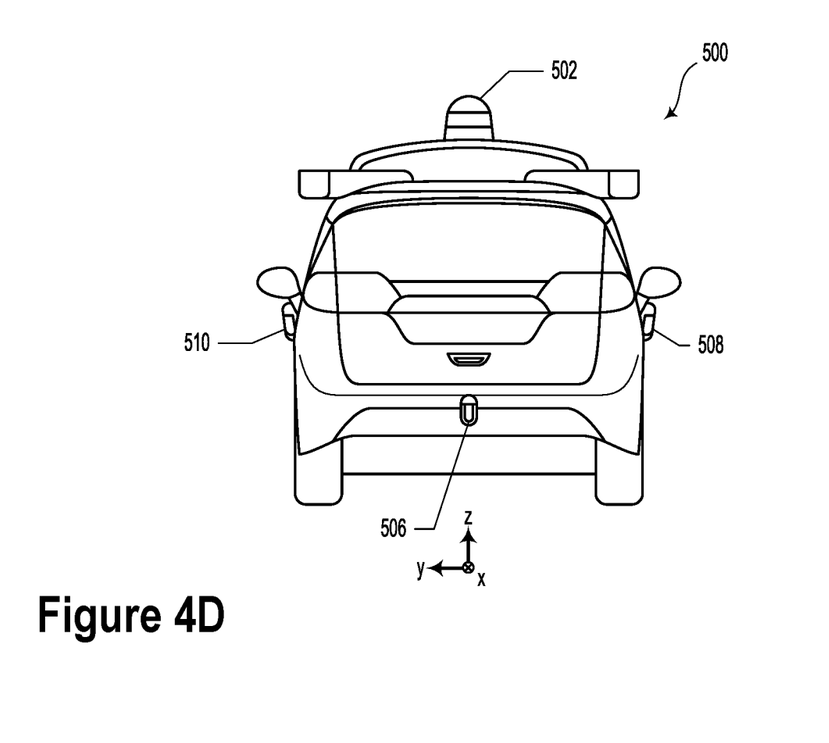
FIG. 4D illustrates a vehicle, according to an example embodiment.
Figure 4E:
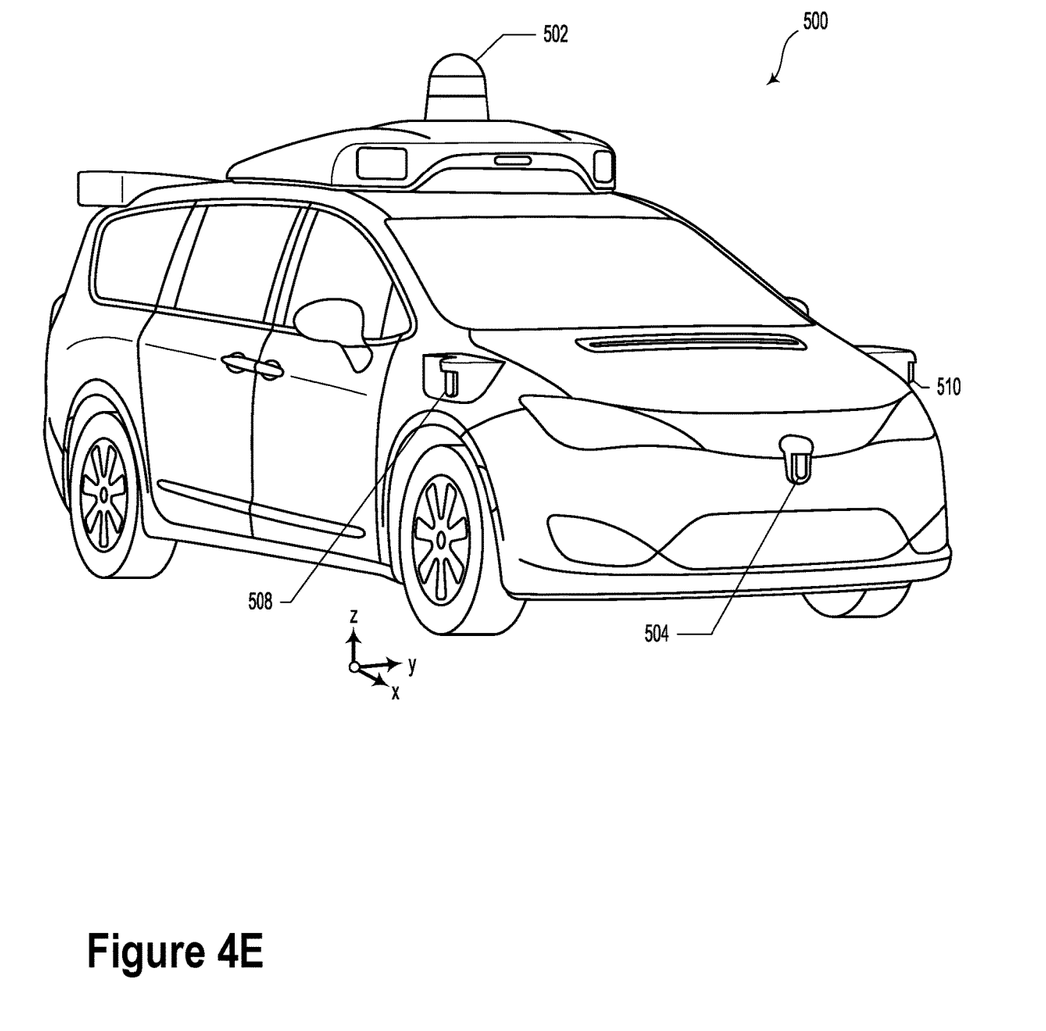
FIG. 4E illustrates a vehicle, according to an example embodiment.

FIG. 3 illustrates the optical system 100 of FIG. 1, according to an example embodiment. As illustrated in FIG. 3, optical system 100 could include a light-emitter device 110, such as a laser source. In some embodiments, the light-emitter device 110 could be disposed at a back focal distance 400 with respect to the optical element 120.

III. Example Vehicles

FIGS. 4A, 4B, 4C, 4D, and 4E illustrate a vehicle 500, according to an example embodiment. In some embodiments, the vehicle 500 could be a semi- or fully-autonomous vehicle. While FIGS. 4A, 4B, 4C, 4D, and 4E illustrates vehicle 500 as being an automobile (e.g., a passenger van), it will be understood that vehicle 500 could include another type of autonomous vehicle, robot, or drone that can navigate within its environment using sensors and other information about its environment.

The vehicle 500 may include one or more sensor systems 502, 504, 506, 508, and 510. In some embodiments, sensor systems 502, 504, 506, 508, and 510 could include optical system(s) 100 as illustrated and described in relation to FIG. 1. In other words, the optical systems and lidar systems described elsewhere herein could be coupled to the vehicle 500 and/or could be utilized in conjunction with various operations of the vehicle 500. As an example, the optical system 100 and/or lidar systems described herein could be utilized in self-driving or other types of navigation, planning, perception, and/or mapping operations of the vehicle 500.

While the one or more sensor systems 502, 504, 506, 508, and 510 are illustrated on certain locations on vehicle 500, it will be understood that more or fewer sensor systems could be utilized with vehicle 500. Furthermore, the locations of such sensor systems could be adjusted, modified, or otherwise changed as compared to the locations of the sensor systems illustrated in FIGS. 4A, 4B, 4C, 4D, and 4E.

In some embodiments, sensor systems 502, 504, 506, 508, and 510 could include a plurality of light-emitter devices arranged over a range of angles with respect to a given plane (e.g., the x-y plane) and/or arranged so as to emit light toward different directions within an environment of the vehicle 500. For example, one or more of the sensor systems 502, 504, 506, 508, and 510 may be configured to rotate about an axis (e.g., the z-axis) perpendicular to the given plane so as to illuminate an environment around the vehicle 500 with light pulses. Based on detecting various aspects of reflected light pulses (e.g., the elapsed time of flight, polarization, intensity, etc.), information about the environment may be determined.

In an example embodiment, sensor systems 502, 504, 506, 508, and 510 may be configured to provide respective point cloud information that may relate to physical objects within the environment of the vehicle 500. While vehicle 500 and sensor systems 502, 504, 506, 508, and 510 are illustrated as including certain features, it will be understood that other types of sensor systems are contemplated within the scope of the present disclosure.

Lidar systems with single or multiple light-emitter devices are also contemplated. For example, light pulses emitted by one or more laser diodes may be controllably directed about an environment of the system. The angle of emission of the light pulses may be adjusted by a scanning device such as, for instance, a mechanical scanning mirror and/or a rotational motor. For example, the scanning devices could rotate in a reciprocating motion about a given axis and/or rotate about a vertical axis. In another embodiment, the light-emitter device may emit light pulses towards a spinning prism mirror, which may cause the light pulses to be emitted into the environment based on an angle of the prism mirror angle when interacting with each light pulse. Additionally or alternatively, scanning optics and/or other types of electro-opto-mechanical devices are possible to scan the light pulses about the environment. While FIGS. 4A-4E illustrate various lidar sensors attached to the vehicle 500, it will be understood that the vehicle 500 could incorporate other types of sensors, such as cameras, radars, etc.

In various embodiments, vehicle 500 could include an optical system (e.g., optical system 100 as illustrated and described in reference to FIG. 1). In such scenarios, the optical system could include a lidar system (e.g., lidar system 160) that may be configured to provide range data within a lidar field of view (e.g., lidar field of view 162). The optical system includes a light-emitter device (e.g., light-emitter device 110) configured to emit emission light. In some embodiments, the light-emitter device could include a multi-bar laser diode device, as described elsewhere herein.

The optical system also includes an optical element (e.g., optical element 120). The optical element includes a first surface (e.g., first surface 130) and an opposing second surface (e.g., second surface 140). The first surface includes a diffusing surface (e.g., diffusing surface 132) configured to diffuse the emission light to form diffused light. The second surface includes a focusing surface (e.g., focusing surface 142) configured to focus the diffused light to provide a desired intensity profile (e.g., desired intensity profile 152) of light emitted within a desired field of view (e.g., desired field of view 150) of the optical system.

In some embodiments, the desired intensity profile includes a uniform angle distribution of light across the lidar field of view.

Additionally or alternatively, in some embodiments the optical element desired field of view overlaps the lidar field of view. As an example, a combination of the light-emitter device and the optical element could provide an illumination region that corresponds to the desired field of view.

In various embodiments, the lidar system could include a housing (e.g., housing 164). In such scenarios, the light-emitter device and the optical element could be disposed inside the housing.

In example embodiments, the optical system could be configured to operate within an operating temperature range between −40° C. and 85° C. Other operating temperature ranges are possible and contemplated.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. An optical system comprising:
   a light-emitter device configured to emit emission light; and
   an optical element comprising a first surface and an opposing second surface, wherein the first surface faces the light-emitter device and comprises a diffusing surface configured to diffuse the emission light to form diffused light, wherein the second surface comprises a focusing surface, wherein a combination of the first surface and the second surface is configured to provide an intensity profile of light emitted within a field of view of the optical system.

2. The optical system of claim 1, wherein the focusing surface comprises a Fresnel lens surface.

3. The optical system of claim 1, wherein the intensity profile comprises a uniform intensity distribution of light emitted within the field of view of the optical system.

4. The optical system of claim 1, wherein the optical element is formed from at least one of: compression molded glass, a cyclic olefin copolymer (COC or COP) material, polymethylmethacrylate, polycarbonate, polypropylene, or polyethylene.

5. The optical system of claim 1, wherein at least one of the first surface or the second surface is coated by an anti-reflective coating.

6. The optical system of claim 1, wherein the optical element is configured to transmit light within a wavelength range between 900 nanometers and 930 nanometers.

7. The optical system of claim 1, wherein the optical system is configured to operate within an operating temperature range between −40° C. and 85° C.

8. The optical system of claim 1, wherein the light-emitter device comprises at least one laser diode device.

9. The optical system of claim 1, further comprising a lidar system configured to provide range data within a lidar field of view, wherein the field of view of the optical system overlaps the lidar field of view.

10. The optical system of claim 9, wherein the lidar system comprises a housing, wherein the light-emitter device and the optical element are disposed inside the housing.

11. A vehicle comprising:
    an optical system, wherein the optical system comprises:
      a lidar system configured to provide range data within a lidar field of view;
      a light-emitter device configured to emit emission light; and
      an optical element comprising a first surface and an opposing second surface, wherein the first surface faces the light-emitter device and comprises a diffusing surface configured to diffuse the emission light to form diffused light, wherein the second surface comprises a focusing surface, wherein a combination of the first surface and the second surface is configured to provide an intensity profile of light emitted within a field of view of the optical system.

12. The vehicle of claim 11, wherein the intensity profile comprises a uniform intensity distribution of light emitted within the field of view of the optical system.

13. The vehicle of claim 11, wherein the field of view of the optical system overlaps the lidar field of view.

14. The vehicle of claim 11, wherein the lidar system comprises a housing, wherein the light-emitter device and the optical element are disposed inside the housing.

15. The vehicle of claim 11, wherein the optical system is configured to operate within an operating temperature range between −40° C. and 85° C.

16. The vehicle of claim 11, wherein the light-emitter device comprises at least one laser diode device.

17. The optical system of claim 9, wherein the lidar system comprises one or light-emitter devices configured to emit light pulses.

18. The optical system of claim 17, wherein the lidar system comprises a scanning device configured to direct the emitted light pulses into an environment of the lidar system.

19. The vehicle of claim 11, wherein the lidar system comprises one or light-emitter devices configured to emit light pulses.

20. The vehicle of claim 19, wherein the lidar system comprises a scanning device configured to direct the emitted light pulses into an environment of the lidar system.

* * * * *